(12) United States Patent
Hayashi et al.

(10) Patent No.: US 11,709,050 B2
(45) Date of Patent: Jul. 25, 2023

(54) POSITION MEASUREMENT METHOD USING A CALIBRATION PLATE TO CORRECT A DETECTION VALUE FROM THE POSITION DETECTOR

(71) Applicant: OMRON Corporation, Kyoto (JP)

(72) Inventors: Shingo Hayashi, Kyoto (JP); Akihisa Matsuyama, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/771,439

(22) PCT Filed: Mar. 10, 2020

(86) PCT No.: PCT/JP2020/010266
§ 371 (c)(1),
(2) Date: Apr. 22, 2022

(87) PCT Pub. No.: WO2021/084772
PCT Pub. Date: May 6, 2021

(65) Prior Publication Data
US 2022/0397386 A1 Dec. 15, 2022

(30) Foreign Application Priority Data
Oct. 28, 2019 (JP) .................................. 2019-195716

(51) Int. Cl.
*G01B 21/04* (2006.01)
*G01B 11/02* (2006.01)
(Continued)

(52) U.S. Cl.
CPC .......... *G01B 21/042* (2013.01); *G01B 11/005* (2013.01); *G01B 11/022* (2013.01); *G01B 11/03* (2013.01); *G01B 21/045* (2013.01)

(58) Field of Classification Search
CPC .... G01B 11/03; G01B 11/022; G01B 5/0014; G01B 11/005; G01B 21/042; G01B 21/045; G01B 11/043
See application file for complete search history.

(56) References Cited

U.S. PATENT DOCUMENTS

| 5,610,846 A | * | 3/1997 | Trapet | G01B 21/045 702/41 |
| 2005/0102118 A1 | * | 5/2005 | Grupp | G01B 11/005 702/150 |

(Continued)

FOREIGN PATENT DOCUMENTS

| JP | S62119607 U | 7/1987 |
| JP | 2001108409 A | 4/2001 |

(Continued)

OTHER PUBLICATIONS

International Search Report issued in International Appln. No. PCT/JP2020/010266 dated Jun. 16, 2020. English translation provided.
Written Opinion issued in International Appln. No. PCT/JP2020/010266 dated Jun. 16, 2020. English translation provided.

*Primary Examiner* — Michael P LaPage
(74) *Attorney, Agent, or Firm* — Rossi, Kimms & McDowell LLP

(57) ABSTRACT

A position measurement method is used by a device including an imaging unit and a position detector that detects a position of the imaging unit to measure, using a detection value at imaging of a measurement point, position coordinates of the measurement point. The method for correcting the detection value from the position detector includes obtaining, with the device, position coordinates of predetermined indices (22) arranged two-dimensionally on a calibration plate (20) as an actual measurement value, obtaining, as a correction value, a difference between the actual measurement value and a true value resulting from transforma- (Continued)

tion of position coordinates of the indices (22) with respect to a reference point on the calibration plate (20), and correcting the detection value from the position detector (8, 9, 10). The imaging unit (3) images measurement points (P) on the measurement target (3) to measure position coordinates of the measurement points (P).

5 Claims, 14 Drawing Sheets

(51) Int. Cl.
    *G01B 11/03*     (2006.01)
    *G01B 11/00*     (2006.01)

(56) References Cited

U.S. PATENT DOCUMENTS

| | | | |
|---|---|---|---|
| 2015/0288952 A1* | 10/2015 | Popilka | A61B 5/1079 |
| | | | 348/46 |
| 2017/0243374 A1* | 8/2017 | Matsuzawa | G06T 7/80 |
| 2020/0271447 A1 | 8/2020 | Aoki et al. | |
| 2020/0408510 A1* | 12/2020 | Drouin | G01B 11/002 |

FOREIGN PATENT DOCUMENTS

| | | |
|---|---|---|
| JP | 2016205957 A | 12/2016 |
| WO | 2019058729 A1 | 3/2019 |

\* cited by examiner

POSITION MEASUREMENT METHOD USING A CALIBRATION PLATE TO CORRECT A DETECTION VALUE FROM THE POSITION DETECTOR

FIELD

The present invention relates to a position measurement method used by a device for measuring the position coordinates of a predetermined measurement point on a measurement target in a specification coordinate system.

BACKGROUND

To measure the dimensions of a measurement target placed on an X-Y table, a known device moves the X-Y table to position a measurement target point at a cursor of a sighting device and measures the displacements of the X-Y table in X- and Y-directions. To reduce errors in measurement values resulting from, for example, slightly curved or roughly orthogonal guide rails in X- and Y-directions, such a dimension measurement device may use a calibration plate placed on the X-Y table, measure multiple marks on the calibration plate with two linear scales in X- and Y-directions, and store the multiple measurement values and accurate values indicating the positions of the marks into an arithmetic unit. For measuring a measurement target, the device corrects, with the arithmetic unit, measurement values from the linear scales based on the stored values (Patent Literature 1).

However, the above known technique includes no technique to correct measurement errors due to insufficient rigidity of the device when a measurement target and an imaging device (sighting device) are moved relative to each other to change the measurement points.

CITATION LIST

Patent Literature

Patent Literature 1: Japanese Unexamined Utility Model Application Publication No. 62-119607

SUMMARY

Technical Problem

In response to the above issue, one or more aspects of the present invention are directed to a technique for correcting a detection value from a position detector such as a linear scale more accurately despite any measurement error due to insufficient rigidity of the device when a measurement target and an imaging device are moved relative to each other to change the measurement points, and thus measuring the position of a measurement point more accurately.

Solution to Problem

A position measurement method according to an aspect of the present invention is used by a device including an imaging unit that images a predetermined measurement point on a measurement target and a position detector that detects a position of the imaging unit or the measurement target. The device measures, using a detection value from the position detector when the imaging unit images the measurement point, position coordinates of the measurement point in a specification coordinate system. The method includes obtaining, with the device, position coordinates of each of a plurality of predetermined indices arranged two-dimensionally on a calibration plate as an actual measurement value in the specification coordinate system, obtaining, as a correction value, a difference between the actual measurement value and a true value resulting from transformation of position coordinates of each of the plurality of predetermined indices obtained in advance with another device with respect to a reference point on the calibration plate to position coordinates in the specification coordinate system, and correcting the detection value from the position detector using the correction value. The correction value is obtained in a manner associated with a moving direction of the imaging unit or the measurement target for the imaging unit imaging the measurement point.

The device in an aspect of the present invention includes the imaging unit that images a measurement point on a measurement target and the position detector that detects the position of the imaging unit or the measurement target. The device uses a detection value from the position detector when the imaging unit images the measurement point to measure the position of the measurement point. Such a device detects the position coordinates of measurement points while moving the imaging unit or the measurement target. The portion that is moved has a weight and a size larger than a certain amount. The device thus receives a larger inertial force when stopping the imaging unit or the measurement target to image a measurement point. An insufficiently rigid portion supporting the imaging unit or the measurement target may thus be deformed or affected in any manner. This may cause measurement errors to vary depending on the moving direction of the imaging unit or the measurement target. Thus, a known technique that accommodates, for correcting a detection value from a position detector, instrumental errors including initial dimensional variations of the device alone without accommodating the moving direction of the imaging unit or the measurement target may have lower measurement accuracy.

In the above aspect of the present invention, correction values are obtained in a manner associated with the moving direction of the imaging unit or the measurement target for the imaging unit imaging a measurement point. A detection value from the position detector can thus be corrected using an appropriate correction value despite any change in the moving direction of the imaging unit or the measurement target. The device can thus have higher accuracy in measuring the position coordinates of a measurement point. The position detector herein is, for example, a linear scale, but may be another instrument such as a rotary encoder. The same applies to the structures below.

A position measurement method according to another aspect of the present invention is used by a device including an imaging unit that images a predetermined measurement point on a measurement target and a position detector that detects a position of the imaging unit or the measurement target. The device measures, using a detection value from the position detector when the imaging unit images the measurement point, position coordinates of the measurement point in a specification coordinate system. The method includes obtaining, with the device, position coordinates of each of a plurality of predetermined indices arranged two-dimensionally on a calibration plate as an actual measurement value in the specification coordinate system, obtaining, as a correction value, a difference between the actual measurement value and a true value resulting from transformation of position coordinates of each of the plurality of predetermined indices obtained in advance with another device with respect to a reference point on the calibration plate to position coordinates in the specification coordinate system, and correcting the detection value from the position detector using the correction value. The imaging unit images a plurality of the measurement points on the measurement target along a predetermined route to measure position coordinates of the plurality of measurement points. The correction value is obtained in a manner associated with the predetermined route.

The moving direction of the imaging unit or the measurement target for the imaging unit imaging a measurement point is determined based on the route to be traveled by the imaging unit to image multiple measurement points. The amount or direction of a possible error for each measurement point thus varies depending on the route to be traveled by the imaging unit to image multiple measurement points. In the above aspect of the present invention, correction values obtained for detection values from the position detector are associated with the route to be traveled by the imaging unit to image multiple measurement points. A detection value from the position detector can thus be corrected using an appropriate correction value in accordance with the moving direction of the imaging unit or the measurement target on each route. This increases the accuracy in measuring the position coordinates of a measurement point on the measurement target more reliably.

In another aspect of the present invention, the obtaining, with the device, the position coordinates of each of the plurality of predetermined indices on the calibration plate as the actual measurement value in the specification coordinate system may include imaging, with the imaging unit, the plurality of predetermined indices along the predetermined route.

In the above aspect, the imaging unit or the measurement target can move in the same direction when the imaging unit images an index on the calibration plate to determine a correction value and when the imaging unit images a measurement point on the actual measurement target. This allows correction of detection values from the position detector using more appropriate correction values in accordance with the route for imaging measurement points on the actual measurement target. The device can thus have further higher accuracy in measuring the position coordinates of a measurement point.

In another aspect of the present invention, the imaging, with the imaging unit, the plurality of measurement points along the predetermined route to measure the position coordinates of the plurality of measurement points may include obtaining the correction value for an index of the plurality of predetermined indices corresponding to a region on the measurement target to be imaged by the imaging unit.

In the above aspect, correction values for indices relevant to the position measurement of actual measurement points alone may be obtained. This eliminates the operation of obtaining all indices arranged on the calibration plate. This reduces the amount of work for obtaining correction values for indices, saving the storage space for correction values to be stored in a memory.

In another aspect of the present invention, the measuring, with the device, the position coordinates of the measurement point in the specification coordinate system may include detecting, with the position detector, position coordinates of a reference point in a region on the measurement target to be imaged by the imaging unit in the specification coordinate system, detecting position coordinates in a field of view of the measurement point with respect to the reference point in the region to be imaged by the imaging unit, and measuring the position coordinates of the measurement point in the specification coordinate system by adding the detected coordinates in the field of view to the position coordinates of the reference point in the specification coordinate system.

Such a device with insufficient rigidity may have a machine element that deforms when the imaging unit or the measurement target stops moving, causing a region to be imaged by the imaging unit to change. The device is thus more likely to have lower measurement accuracy. A movable imaging unit with higher functionality included in the device can be heavier and larger. This increases an inertial force occurring when the imaging unit moves, possibly lowering the measurement accuracy of the device further. The method according to the above aspect of the present invention used for such a device can more effectively produce the advantageous effect of the above aspect of the present invention of obtaining a more appropriate correction value.

The above aspects of the present invention directed to the above issue may be combined with one another in any manner.

Advantageous Effects

In the above aspects of the present invention, a detection value from the position detector can be corrected more accurately despite any measurement error due to insufficient rigidity of the device when the measurement target and the imaging device are moved relative to each other to change measurement points, thus allowing more accurate measurement of the position of a measurement point.

DETAILED DESCRIPTION

Example Use

Figure 1:
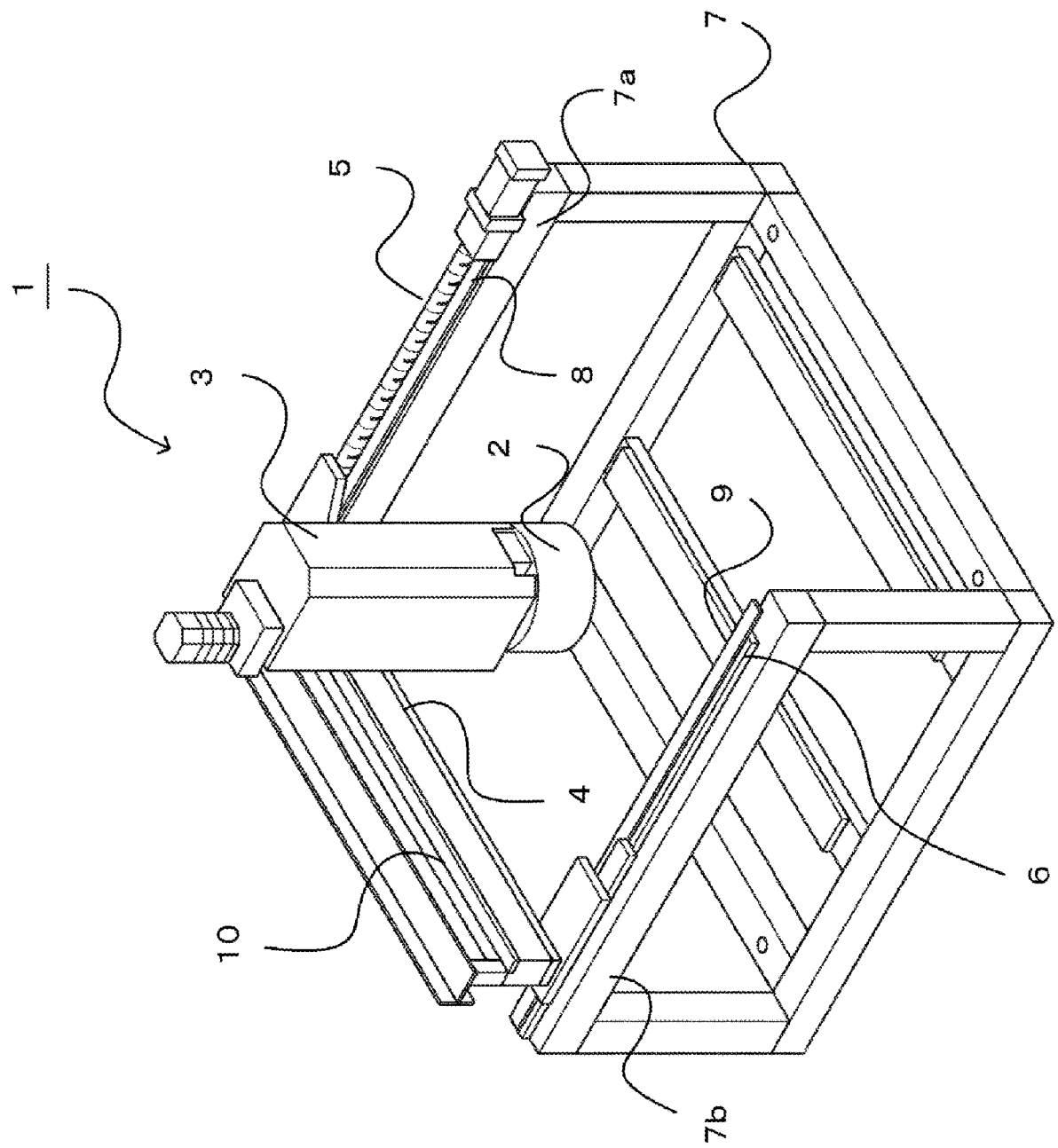
FIG. 1 is a schematic perspective view of a dimension inspection device in an example use.

A dimension inspection device 1 as an example use of the present invention will now be described with reference to the drawings. FIG. 1 is a schematic perspective view of the dimension inspection device 1 showing its main components. The dimension inspection device 1 mainly includes a mount 4, a ball screw 5, a guide 6, and a frame 7 supporting these members. The mount 4 supports an imaging unit 3 as an imaging unit including a camera 2 for imaging a measurement target in a manner movable in X-direction. The ball screw 5 drives the mount 4 in Y-direction. The guide 6 guides the mount 4 driven by the ball screw 5 in Y-direction. The frame 7 includes a ball screw support 7a extending in Y-direction, on which a linear scale 8 that detects the position of the mount 4 is located parallel to the ball screw 5. Similarly, the frame 7 includes a guide support 7b extending in Y-direction, on which a linear scale 9 that detects the position of the mount 4 is located parallel to a rail for guiding a slider on the mount 4. A linear scale 10 that detects the position of the imaging unit 3 extends along the mount 4 in X-direction. The linear scales 8, 9, and 10 each include a detection target located along the frame 7 and the mount 4 and a detector located on the mount 4 and the imaging unit 3. The detector detects positional information about the detection target. The linear scales 8, 9, and 10 each correspond to a position detector.

In the dimension inspection device 1 in FIG. 1, the imaging unit 3 includes the camera 2 with its field of view facing downward. A conveyor for transporting a measurement target in X-direction is located below the camera 2. A measurement target fed in by the conveyor from outside the dimension inspection device 1 stops below the camera 2 and is clamped at a predetermined position. After inspection, the conveyor transports the measurement target from below the camera 2 to outside the dimension inspection device 1.

Figure 2A:
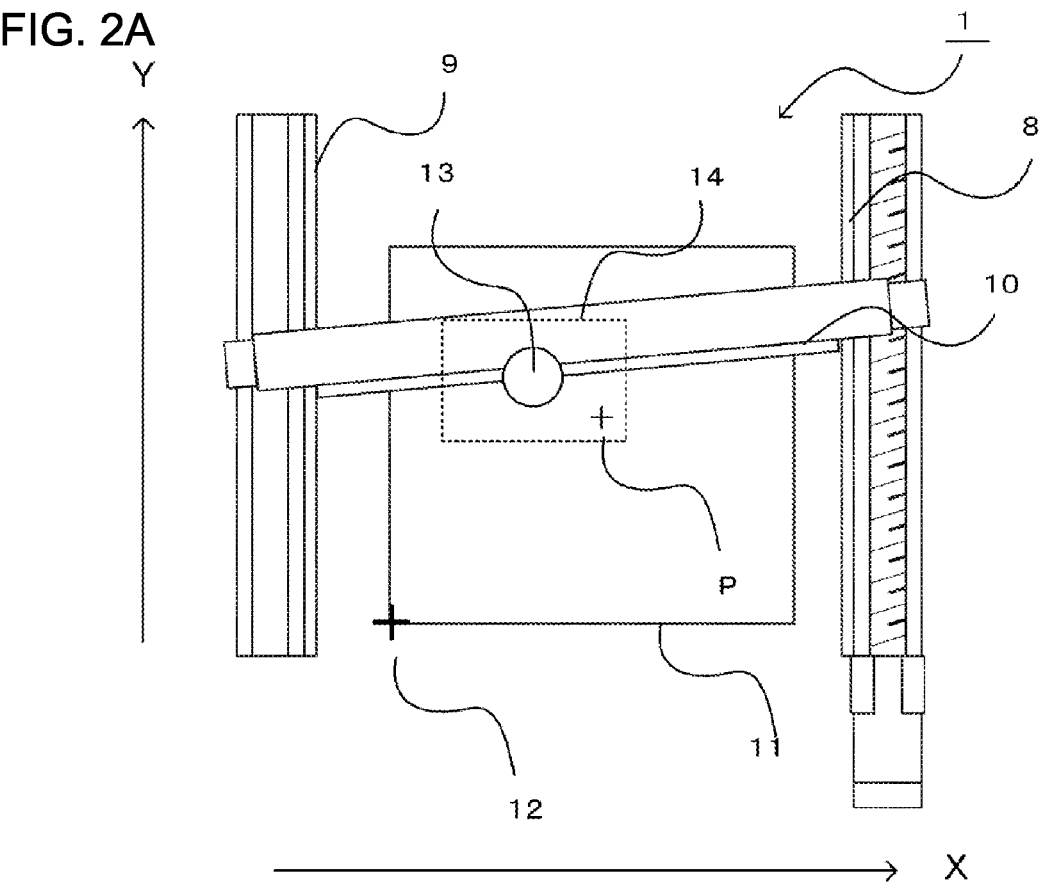
FIG. 2A is a schematic plan view of the dimension inspection device in the example use.
Figure 2B:
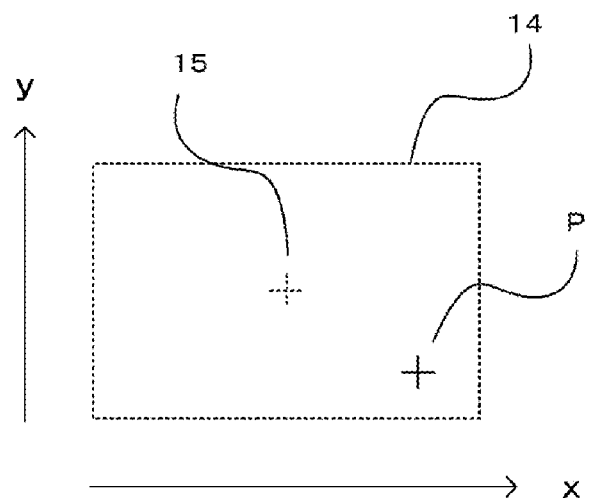
FIG. 2B is an enlarged view of a field of view.

A method for determining the position coordinates of a measurement point P on a substrate 11 as an example measurement target will now be described. FIG. 2A is a schematic view of the dimension inspection device 1 with the substrate 11 placed at a predetermined position, as viewed from vertically above. The ball screw 5, the linear scale 8, the guide 6, and the linear scale 9 are parallel in Y-direction. The mount 4 supporting the imaging unit 3 extends in a direction intersecting with Y-direction. In FIG. 2A, a point 12 is the origin of a substrate coordinate system defined for the substrate 11. The substrate coordinate system is an example of a specification coordinate system in the present example use. A point 13 is an axial position of an imaging system. In this example, the point 13 is the position of the optical axis of the camera 2. The region enclosed by the broken line in FIGS. 2A and 2B is a field of view 14 of the camera 2. The measurement point P on the substrate 11 is included in the field of view 14. The field of view 14 in the present example use corresponds to a region on a measurement target to be imaged by the imaging unit. FIG. 2B is an enlarged view of the field of view 14 enclosed by the broken line in FIG. 2A. A point 15 is the origin of a field-of-view coordinate system, with the center of the field of view represented by (0, 0). The origin 15 of the field-of-view coordinate system in the present example use corresponds to a reference point, and aligns with the axial position 13 of the imaging system.

In the present example use, the position of the measurement point P on the substrate 11 in, for example, the substrate coordinate system with its origin at the left lower corner of the substrate 11 represented by (0, 0), is calculated as P=axial position of the imaging system+detected coordinates in the field of view. In other words, the position coordinates of the measurement point P in the substrate coordinate system are measured by adding the axial position of the imaging system as a detection value from the linear scales 8, 9, and 10 to the position of the measurement point P in the field of view 14. For the dimension inspection device 1, measurement values from the linear scales 8, 9, and 10 may have a large error depending on the temperature of the dimension inspection device 1, the dimensions of and variations and change in the shape of the frames 7a and 7b, the mount 4, and other members. In a dimension inspection of the substrate 11 (an inspection to determine whether each element on the substrate 11 is located as designed) using the dimension inspection device 1, the imaging unit 3 is moved using, for example, the ball screw 5, and stopped at a position at which the measurement point P appears in the field of view 14. In this case, the frame 7a, the frame 7b, the mount 4, or any other machine element may deflect, causing the direction or the amount of the error to vary depending on the moving direction of the imaging unit 3.

Figure 3:
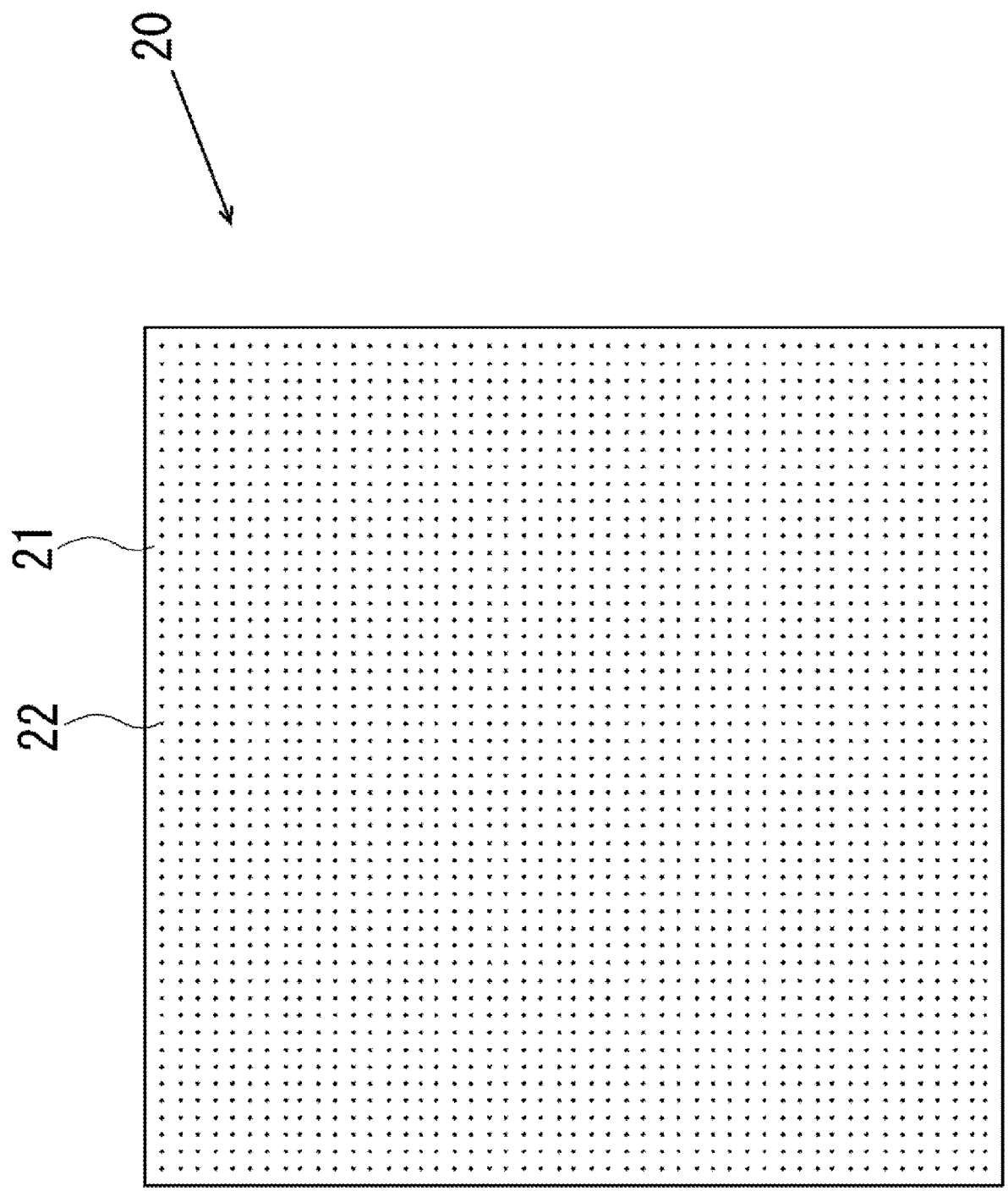
FIG. 3 is a schematic view of a calibration plate in the example use.

In the present example use, a calibration plate 20 as a calibration plate for which true values of its dimensions are known, as shown in FIG. 3, is used to correct measurement values from the linear scales 8, 9, and 10. More specifically, with a reference point (e.g., the lower left corner) of the calibration plate 20 being the origin, coordinate values of each dot are premeasured with a higher-level measuring instrument. The position coordinates of predetermined dots on the calibration plate 20 are then actually measured with the dimension inspection device 1. For each dot, the difference between its true value and actual measurement value is stored as a correction value. In an actual dimension inspection of the substrate 11, detection values from the linear scales 8, 9, 10 with the measurement point P on the substrate 11 being within the field of view 14 are corrected with prestored correction values. The calibration plate 20 is a glass plate 21 with minute dots 22 as indices arranged at a pitch of 5 mm, which are formed by depositing aluminum on the glass plate 21.

As described above, the dimension inspection device 1 is likely to have varying errors depending on the moving direction of the imaging unit 3 before it stops. This is because one or more machine elements supporting the imaging unit 3 have the rigidity varying for each direction. In the present example use, a correction value for each dot on the calibration plate 20 is stored for each direction in which the imaging unit 3 moves. This allows, in each inspection program of a dimension inspection of the substrate 11, an optimum correction value for each dot on the calibration plate 20 to be used in accordance with the moving direction of the imaging unit 3, thus improving the correction accuracy.

In the present example use, a correction value for each dot on the calibration plate 20 is stored for each imaging route for the imaging unit 3 to travel in an actual dimension inspection of the substrate 11. This is because the moving direction of the imaging unit 3 is different for each imaging route and a correction value for the same dot is also different for each imaging route. Additionally, in the present example use, correction values may be obtained and stored for each inspection program of a dimension inspection. This is because the inspection programs of a dimension inspection correspond one-to-one with the imaging routes for the imaging unit 3.

Figure 4:
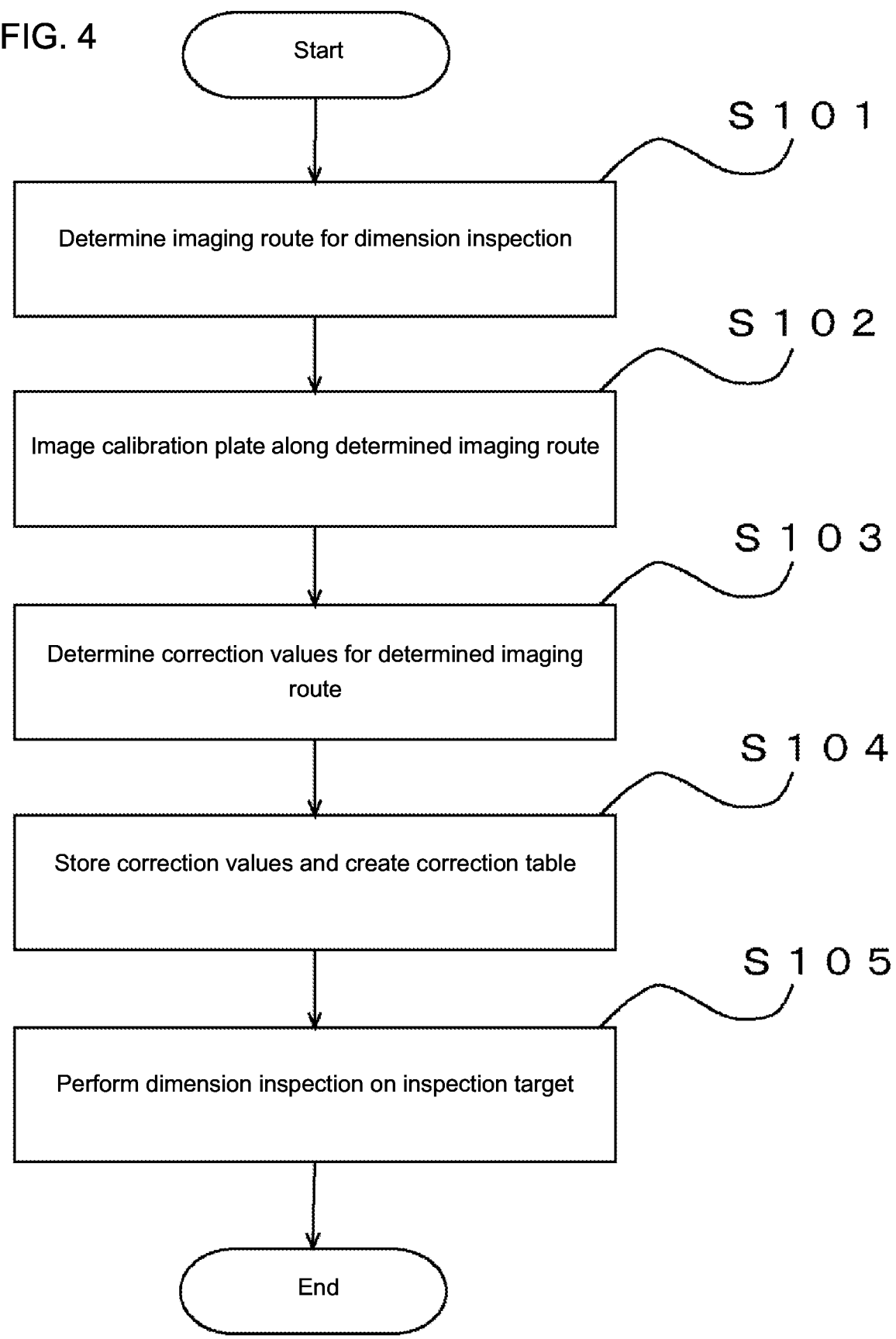
FIG. 4 is a flowchart of a dimension inspection method in the example use.

FIG. 4 is a flowchart of a dimension inspection method according to the present example use. In the procedure, an imaging route for the imaging unit 3 in a dimension inspection is first determined in step S101. In subsequent step S102, each dot on the calibration plate 20 is imaged along the determined imaging route. In step S103, a correction value (a difference between an actual measurement value and a true value) for each dot is determined for the determined imaging route. In step S104, the determined correction value is stored into a storage in the dimension inspection device 1 to create a correction table. In step S105, a dimension inspection of a measurement target is then performed using the dimension inspection device 1. In the inspection, detection values from the linear scales 8, 9, and 10 are corrected with the corresponding correction values stored in the storage, and the corrected detection values are stored as inspection results. When the dimension inspection is complete, the routine ends. In the present example use, the above procedure can increase measurement accuracy in a dimension inspection.

Additionally, in the present example use, correction values for dots corresponding to the region (or the field of view 14) to be imaged with the imaging unit 3 in each inspection program alone may be obtained as correction values for the dots on the calibration plate 20. This reduces the number of correction values to be obtained and stored as correction values for the dots, shortening the time taken to obtain correction values and reducing the storage space for storing correction values. The position measurement method according to one or more embodiments of the present invention is applicable to the dimension inspection device 1 described above. The dimension inspection device 1 may be any device for measuring the length of a particular portion of a measurement target, and may also be any device for measuring the angle or curvature (radius) of a particular portion.

First Embodiment

Figure 5:
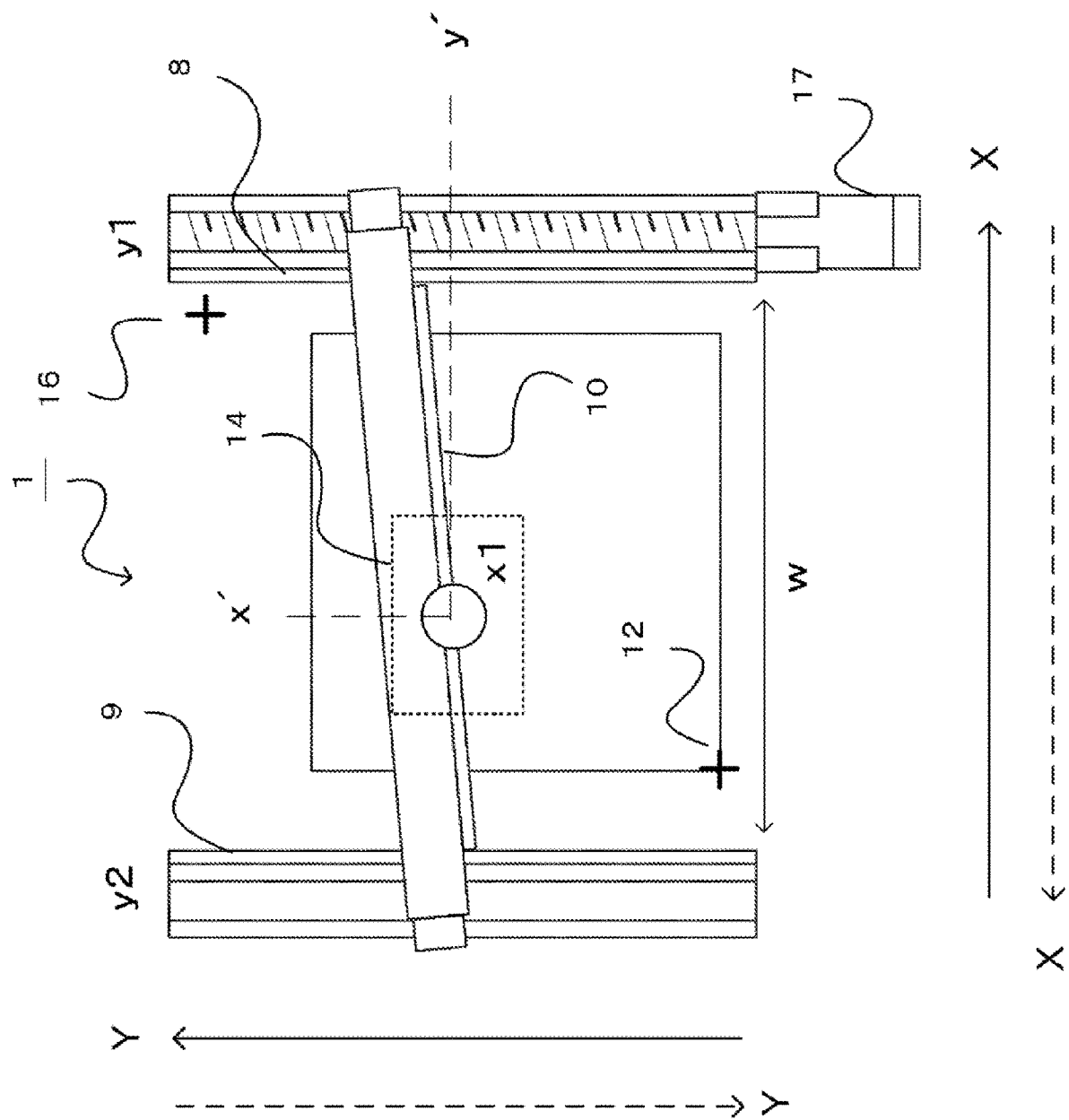
FIG. 5 is a diagram describing a method for calculating an axial position of an imaging system in an embodiment.

A first embodiment of the present invention will now be described in detail. Referring to FIG. 5, a method for calculating the axial position 13 of the imaging system for correcting detection values from the linear scales 8, 9, and 10 will be described first. In FIG. 5, the solid arrows indicate the substrate coordinate system with the reference point at a predetermined position (corner) on the substrate 11, and the dashed arrows indicate a machine coordinate system with the reference point at a predetermined position on the dimension inspection device 1. In the present embodiment, a point 16 is the origin of the machine coordinate system. A motor is denoted with reference numeral 17. In FIG. 5, y1 (μm) indicates a detection value from the linear scale 8, y2 (μm) indicates a detection value from the linear scale 9, x1 (μm) indicates a detection value from the linear scale 10, and w (μm) indicates the distance between the linear scales 8 and 9. In the present embodiment, detection values from the linear scales 8, 9, and 10 are determined in the substrate coordinate system with its origin 12 represented by (0, 0) (or in the machine coordinate system with its origin represented by (0, 0)). In this case, the position coordinates (x' (μm), y' (μm)) of the axial position 13 of the imaging system are calculated with Formulas 1a and 1b below.

$$y'=y2-(y2-y1)\times(x1/w) \quad (1a)$$

$$x'=x1 \quad (1b)$$

With y2−y1 being small relative to w, x'≈x1. Thus, x' is approximated as x'=x1.

Figure 6:
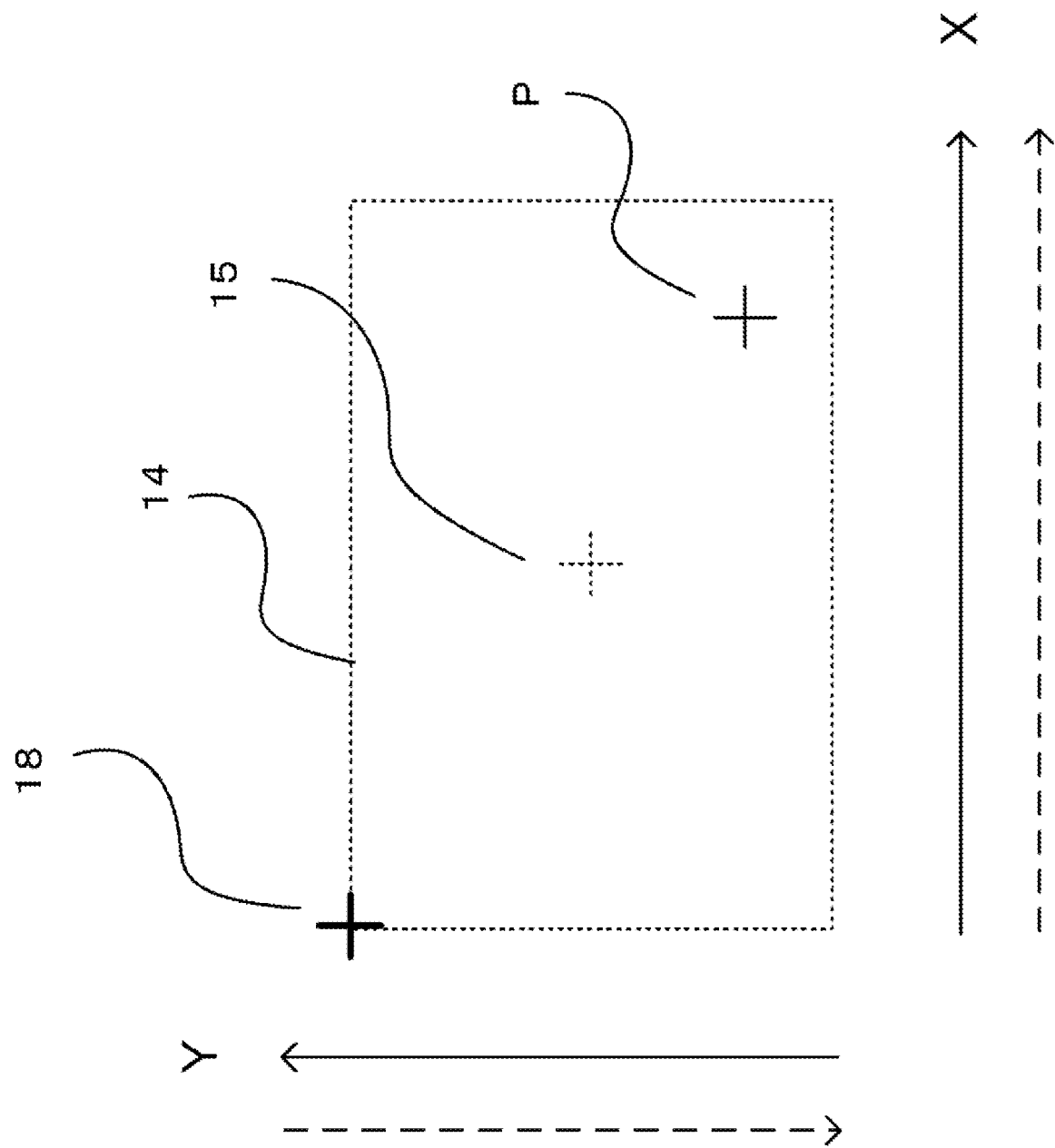
FIG. 6 is a diagram showing the relationship between an image processing system and a field-of-view coordinate system in the embodiment.

The position coordinates of a point detected in the field of view 14 are transformed from an image processing system in the imaging unit 3 to the field-of-view coordinate system in the manner described below with reference to FIG. 6. FIG. 6 shows the field of view 14 shown in FIG. 2B. The solid arrows indicate the field-of-view coordinate system, and the broken arrows indicate the image processing system. A point 18 is the origin of the image processing system, with the left upper corner of the field of view represented by (0, 0). In the present embodiment, x (pixel) is the X-coordinate, and y (pixel) is the Y-coordinate in the image processing system. xv' (μm) is the X-coordinate, and yv' (μm) is the Y-coordinate in the field-of-view coordinate system. The width (pixel) is the lateral length of an image of the field of view, the height (pixel) is the vertical length of the image, and a is the resolution of the camera 2 (e.g., 6 or 10 μm).

In this case, the coordinates are transformed from the image processing system to the field-of-view coordinate system using Formulas 2a and 2b below.

$$xv'=(x-\text{width}/2)\times\alpha \quad (2a)$$

$$yv'=\{(\text{height}-y)-\text{height}/2\}\times\alpha \quad (2b)$$

The position coordinates (xb, yb) of the measurement point P in the substrate coordinate system with its origin 12 on the substrate 11 represented by (0, 0) are obtained with Formulas 3a and 3b below.

$$xb=x'+xv' \quad (3a)$$

$$yb=y'+yv' \quad (3b)$$

Figure 7:
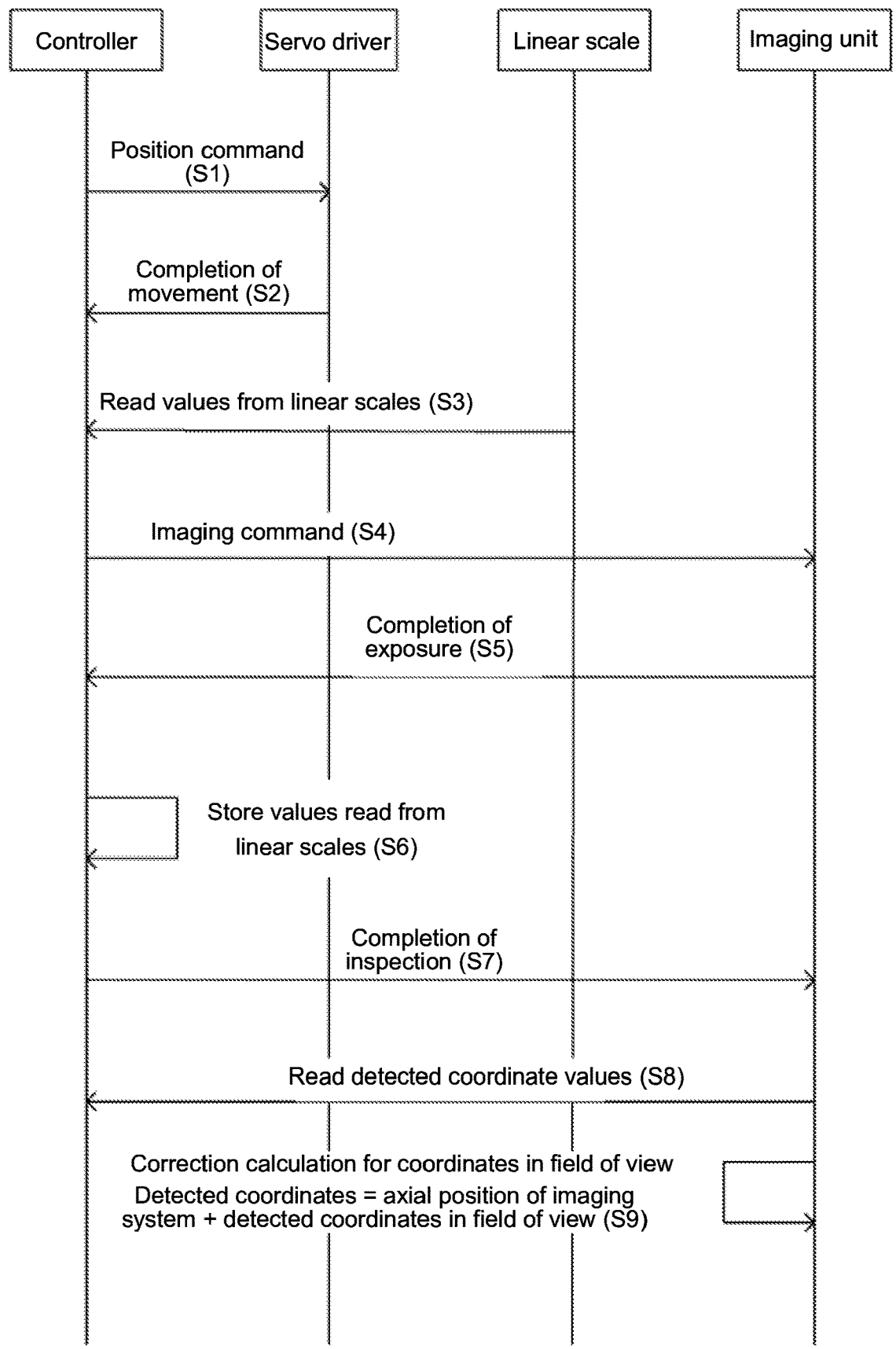
FIG. 7 is a timing chart showing an inspection procedure for the dimension inspection device in the embodiment.

A dimension inspection procedure for the dimension inspection device 1 will now be described with reference to the timing chart shown in FIG. 7. When a dimension inspection using the dimension inspection device 1 starts, a controller first transmits a position command to a servo driver (step S1). In response to the position command, the servo driver drives a servomotor to move the mount 4 and the imaging unit 3. After the mount 4 and the imaging unit 3 are moved to predetermined positions, the servo driver transmits information about the completion of the movement to the controller (step S2). The controller then reads detection values from the linear scales 8, 9, and 10 with the mount 4 and the imaging unit 3 at the predetermined positions (step S3). The controller then transmits an imaging command to the imaging unit 3 (step S4). After performing imaging, the imaging unit 3 transmits information about the completion of the exposure to the controller (step S5). The processing in steps S1 to S5 is repeated until imaging is complete for all measurement points P. The controller stores values read from the linear scales 8, 9, and 10 into a predetermined area in the storage (step S6). This completes the inspection (step S7). The controller then reads, from an image processor in the imaging unit 3, detected coordinates of each measurement point P in the corresponding field of view (step S8). The image processor in the imaging unit 3 performs a calculation of a formula expressed as detected coordinates=axial position of the imaging system+detected coordinates in the field of view, and performs a correction calculation on the axial position of the imaging system based on correction values obtained in advance (step S9).

Figure 8:
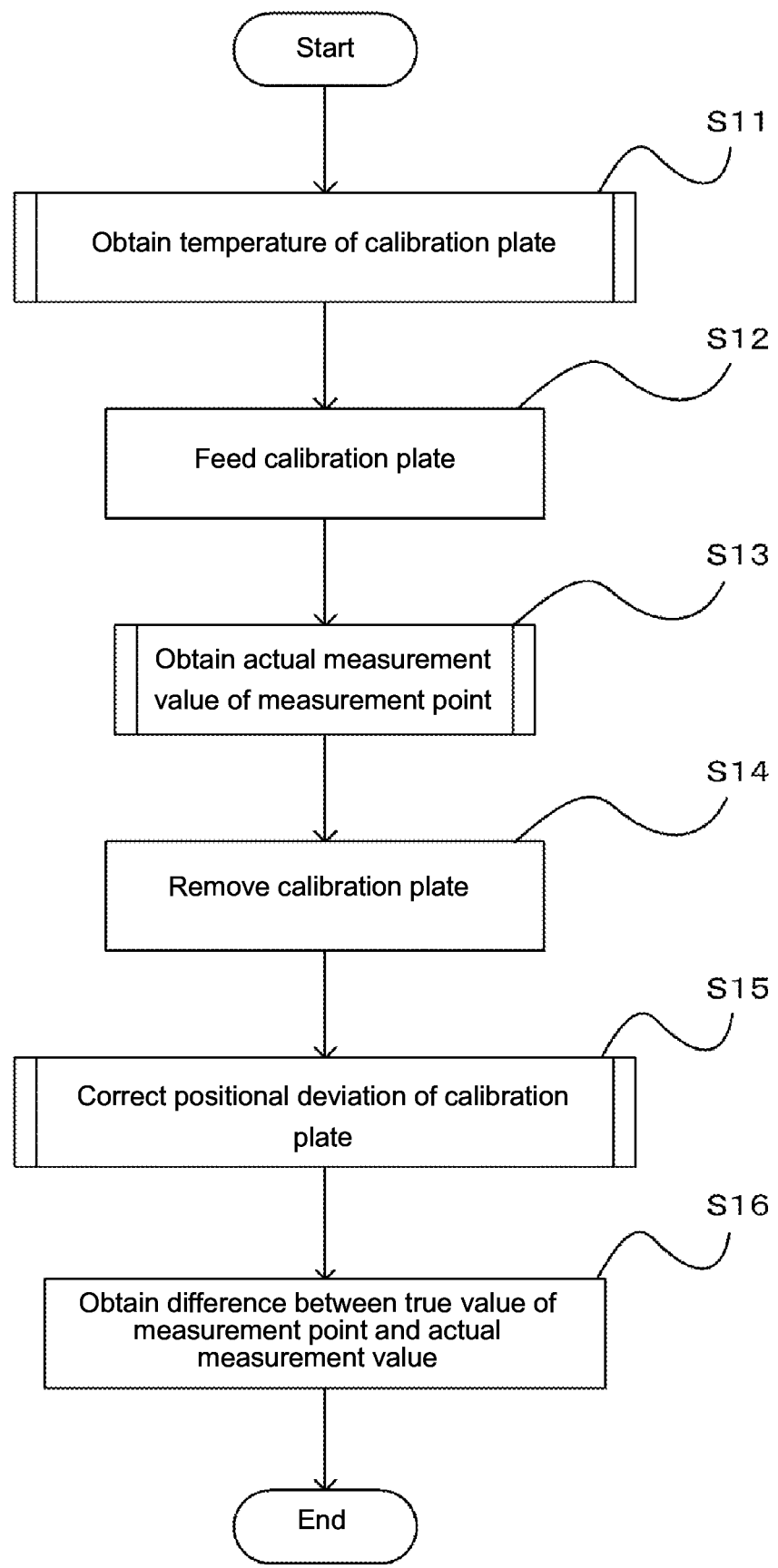
FIG. 8 is a flowchart showing main steps in a calibration procedure in the embodiment.

The procedure for obtaining a correction value using the calibration plate 20 described above (calibration) will now be described. FIG. 8 is a flowchart showing main steps in a calibration procedure. This process is performed, for example, when an operator selects a calibration mode by inputting an instruction through an operation panel in the dimension inspection device 1 during the assembly and adjustment of or a periodic inspection of the dimension inspection device 1.

Figure 9:
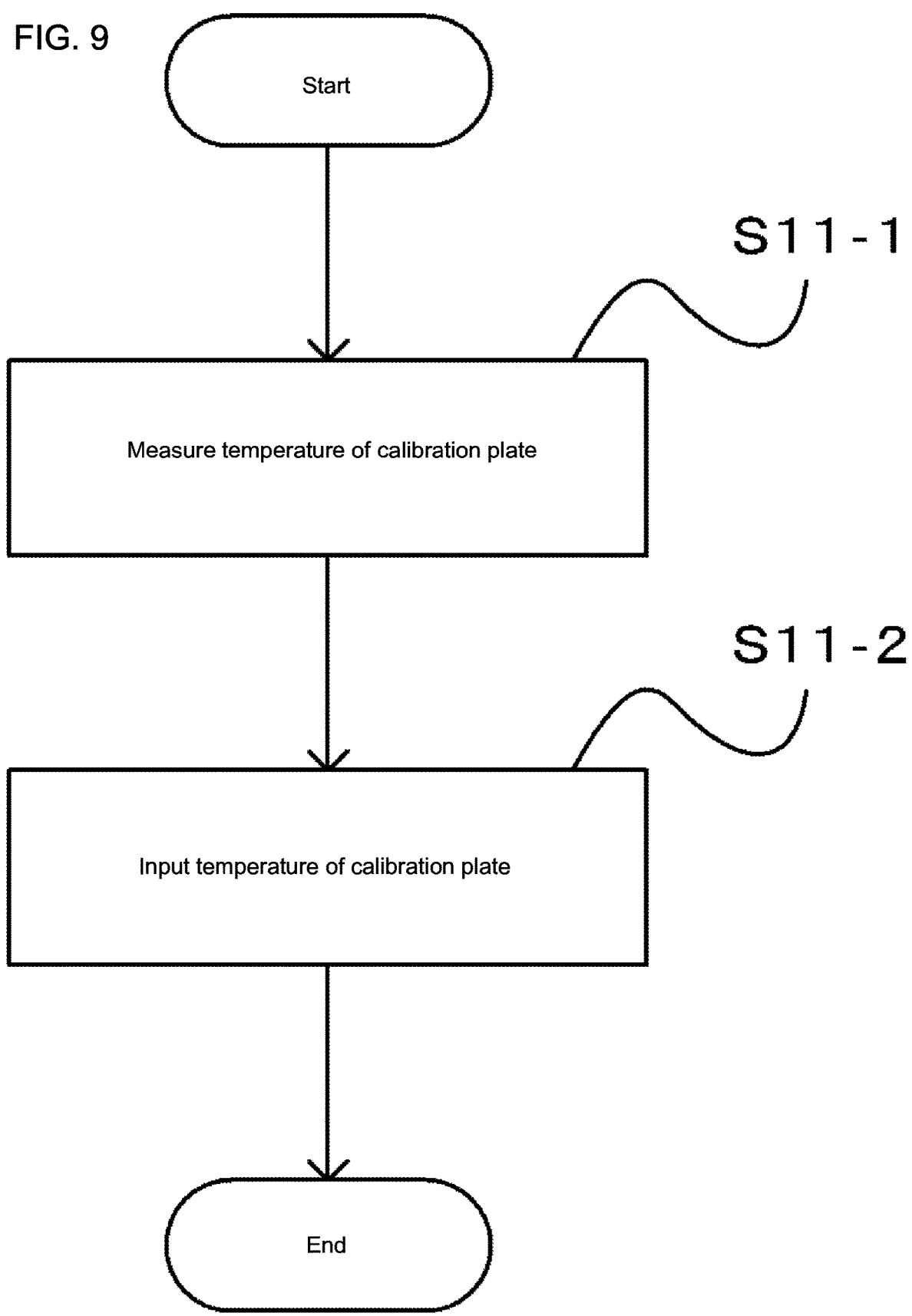
FIG. 9 is a flowchart showing a procedure for obtaining the temperature of the calibration plate in the embodiment.

In the procedure, the temperature of the calibration plate 20 is first obtained for correcting thermal expansion due to a change in the temperature of the calibration plate 20 (step S11). The subroutine of this step will now be described with reference to FIG. 9. The temperature of the calibration plate 20 is first measured using a temperature measurement unit such as a contactless thermometer (step S11-1). The measured temperature of the calibration plate 20 is input through the operation panel to be stored into a predetermined storage area in the storage (step S11-2). The temperature data thus obtained is used for correcting thermal expansion due to a change in temperature.

A change in distance due to thermal expansion is calculated with Formula 4 below.

Change in distance due to thermal expansion (μm)= thermal expansion coefficient×difference between a measured temperature and a temperature when a true value is measured (degrees)× distance from the origin at the edge of the calibration plate (mm)÷1000 (4)

Figure 10:
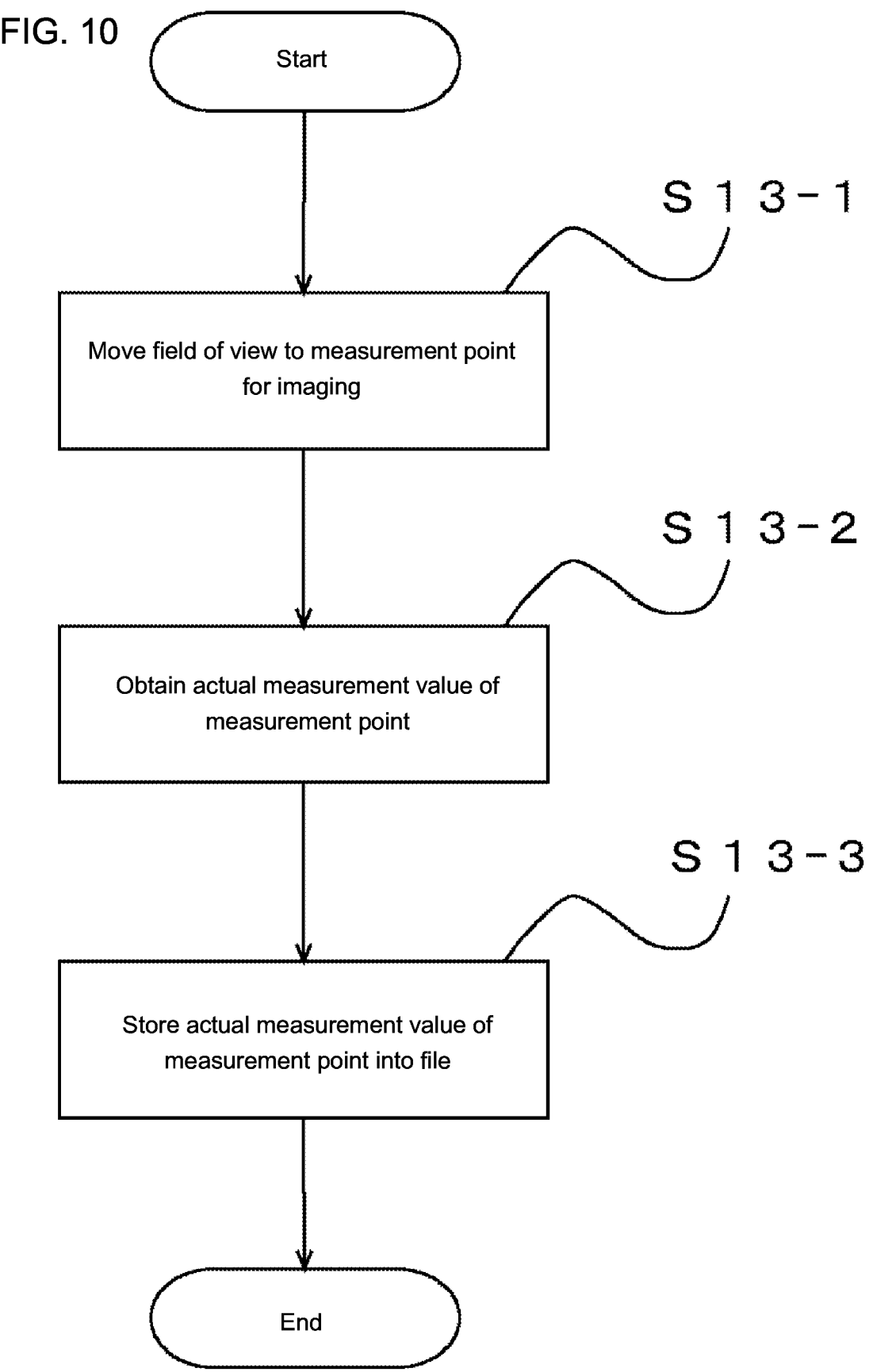
FIG. 10 is a flowchart showing a procedure for obtaining an actual measurement value for a measurement point in the embodiment.

The calibration plate 20 is then transported by the conveyor into the dimension inspection device 1, or more specifically, to below the camera 2 (step S12). An actual measurement value for each measurement point (each dot) is then obtained (step S13). The subroutine of obtaining an actual measurement value for each measurement point (each dot) will be described in detail with reference to the flowchart in FIG. 10. For describing the subroutine of obtaining the actual value, FIG. 11 shows the calibration plate 20 and areas on the calibration plate 20 with measurement points (dots) to be imaged by the imaging unit 3.

Figure 11:
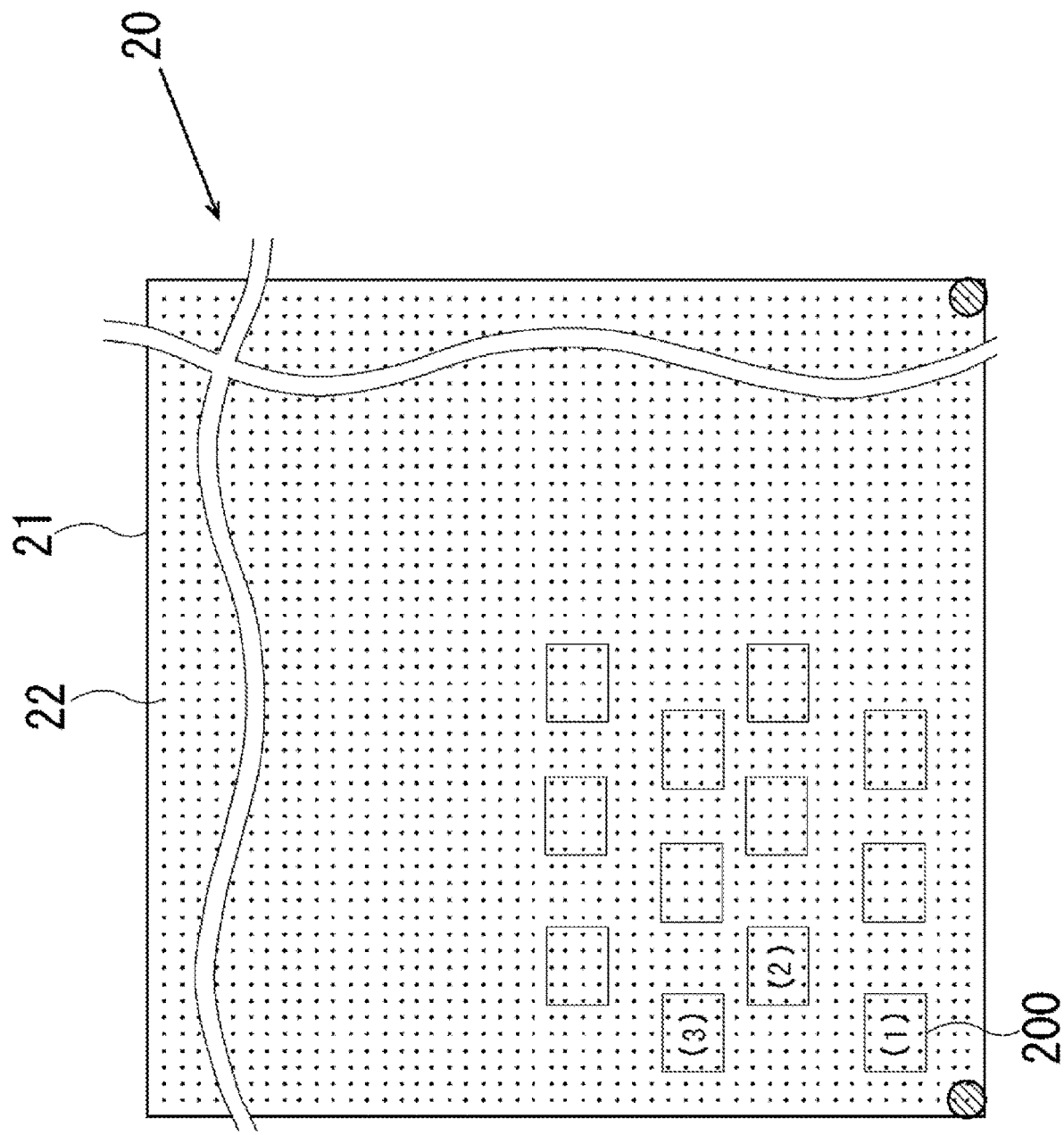
FIG. 11 is a view of the calibration plate in the embodiment, showing locations for an imaging unit to obtain images of measurement points.

As shown in FIG. 11, to actually measure the position of each measurement point (each dot) on the calibration plate 20, the imaging unit 3 travels the same route as the imaging route traveled in an actual dimension inspection of the substrate 11, stops at the same position as the position at which the imaging unit 3 stops in a dimension inspection of the substrate 11, and obtains an image of each measurement point (each dot). In FIG. 11, for example, an image of each measurement point (each dot) is obtained, along the imaging route for an actual dimension inspection of the substrate 11, in the order of a field of view (1), a field of view (2), a field of view (3), and subsequent fields of view (step S13-1). The direction in which the imaging unit 3 moves in an inspection of the substrate 11 is the same as the direction in which the imaging unit 3 moves in the process of obtaining actual measurement values.

Figure 12:
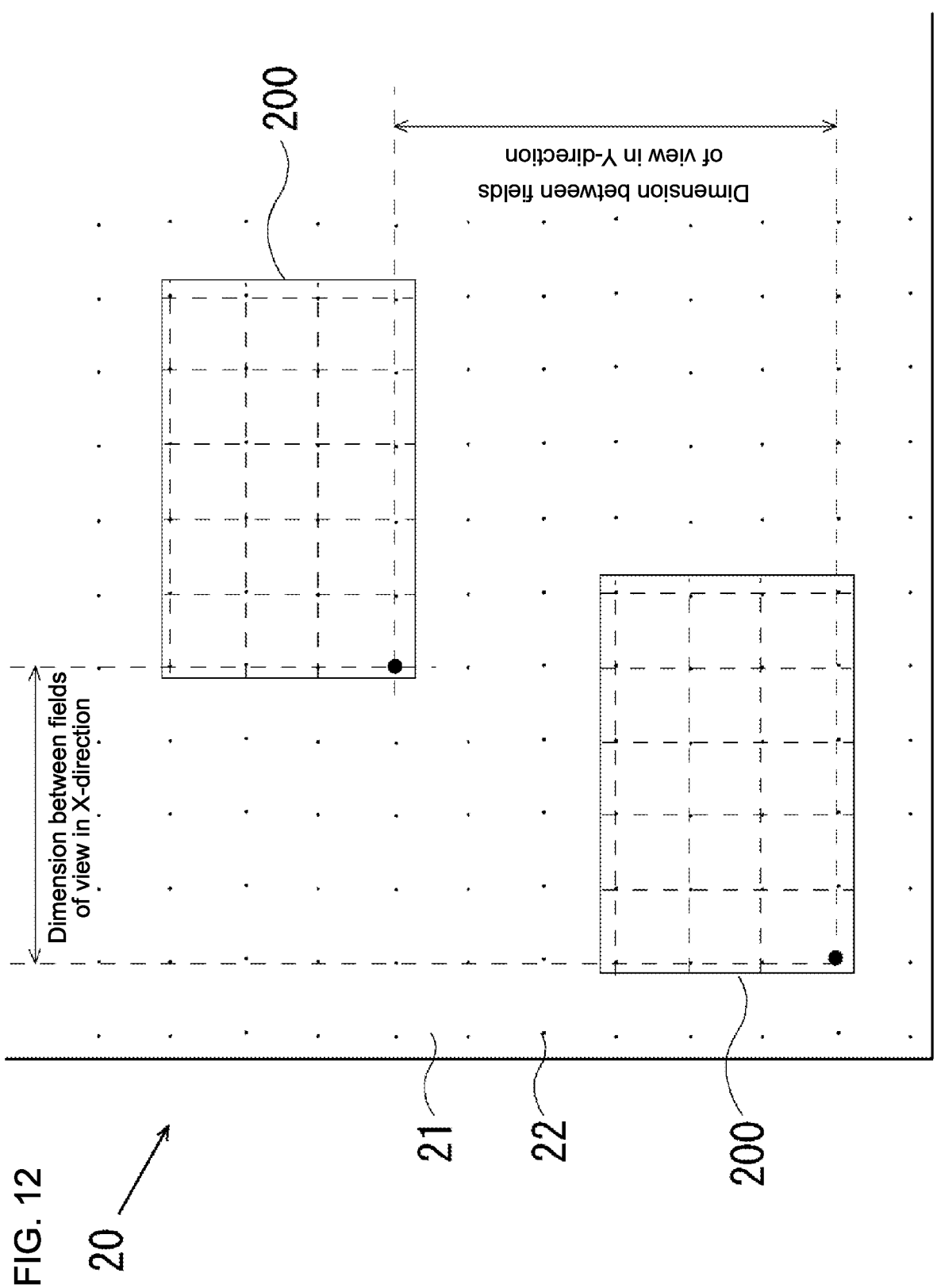
FIG. 12 is an enlarged view of the calibration plate in the embodiment, showing the relationship between fields of view.

FIG. 12 is an enlarged view of an area including the field of view (1) and the field of view (2) in FIG. 11. As shown in FIG. 12, the dimensions in X- and Y-directions for the dot at a lower left position in each field of view 200 are actually measured with the linear scales 8, 9, and 10 in the same manner as for the dimension inspection of the substrate 11. The coordinate values of other dots in each field of view 200 are calculated in image processing for each field of view 200 (step S13-2). The coordinate values of each dot are stored into a file (step S13-3). Dots in each field of view 200 correspond to indices corresponding to a region on a measurement target to be imaged by the imaging unit.

Figure 13:
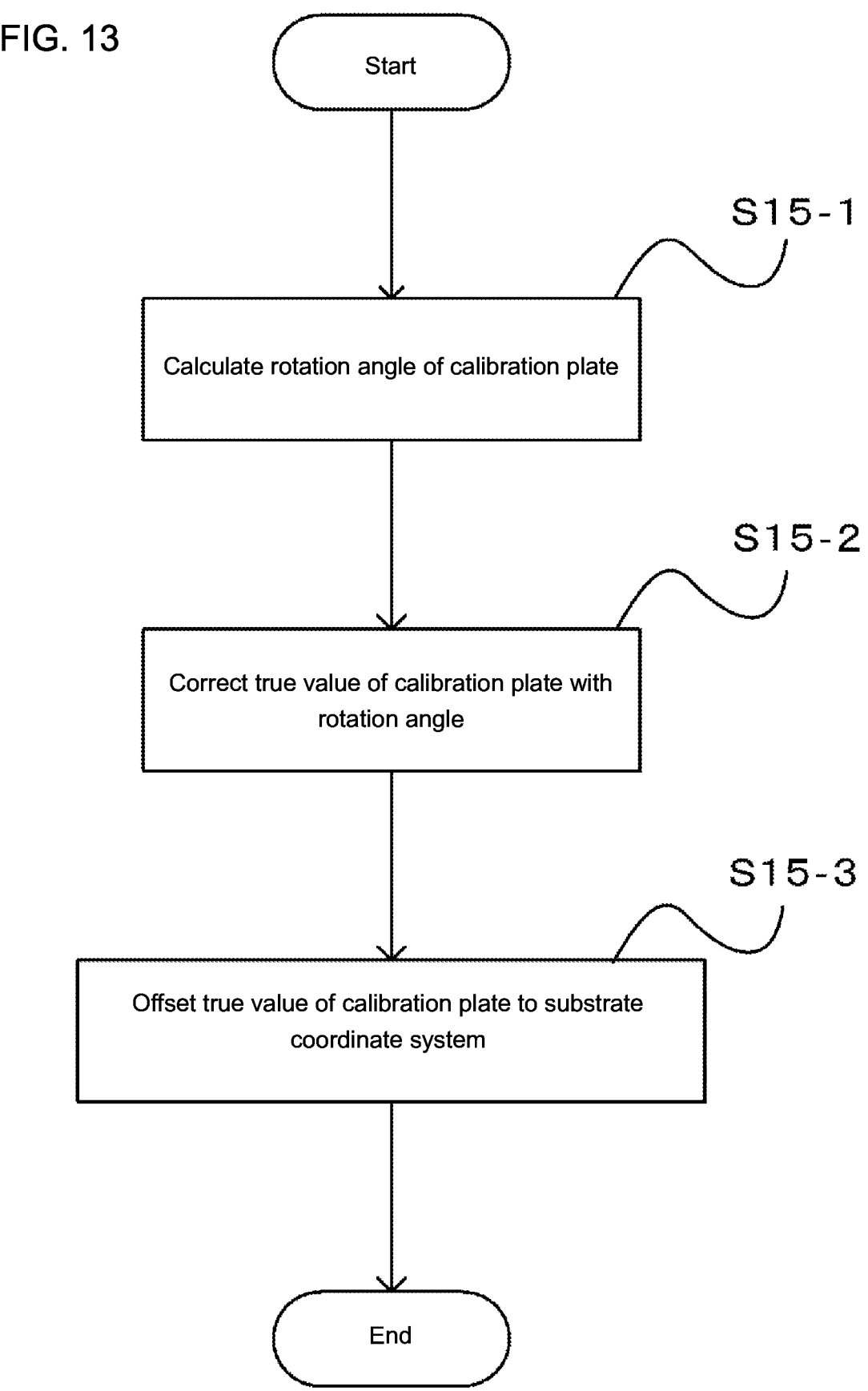
FIG. 13 is a flowchart showing a procedure for correcting a positional deviation of the calibration plate in the embodiment.

Referring back to FIG. 7, the calibration plate 20 is then transported by the conveyor to outside the dimension inspection device 1 (step S14). A positional deviation of the calibration plate 20 is then corrected (step S15). The subroutine of correcting the positional deviation of the calibration plate 20 will now be described in detail with reference to FIG. 13. In the subroutine of correcting the positional deviation in FIG. 13, the rotation angle θ of the calibration plate 20 is first determined with Formula 5 below using dots at lower left and lower right positions on the calibration plate 20 (indicated with hatched circles in FIG. 11) (step S15-1).

θ(rad)=arctan{(measured Y-coordinate value of the lower right dot−measured Y-coordinate value of the lower left dot)/(measured X-coordinate value of the lower right dot−measured X-coordinate value of the lower right dot)} (5)

True values (XT, YT) of the calibration plate 20 reflecting the initial true values premeasured with a higher-level measuring instrument and stored and a change in temperature during calibration are corrected for tilt with Formulas 6a and 6b below (step S15-2).

$XT'=XT \cos θ−YT \sin θ$ (6a)

$YT'=XT \sin θ+YT \cos θ$ (6b)

The true values are then offset to the substrate coordinate system with Formulas 7a and 7b below with respect to the coordinate values (XT', YT') of the lower left corner of the calibration plate 20 calculated with Formulas 6a and 6b (step S15-3).

$XT''=XT'$+lower left corner of the calibration plate (XT) (7a)

$YT''=YT'$+lower left corner of the calibration plate (YT) (7b)

Referring back to FIG. 7, the differences (true value differences) between XT", YT" (true values of the calibration plate 20) calculated with Formulas 7a and 7b and the values prestored in the file are obtained and stored (step S16).

In step S16, true value differences for all dots imaged are determined and stored in a correction table. Data in the correction table is defined with, for example, Formulas 8a and 8b below.

Correction table[field of view $n$][measurement point $m$].x=true value[field of view $n$][measurement point $m$].x−measurement value[field of view $n$][measurement point $m$].x (8a)

Correction table[field of view $n$][measurement point $m$].y=true value[field of view $n$][measurement point $m$].y−measurement value[field of view $n$][measurement point $m$].y (8b)

In the formulas, [zzz] represents an array, the field of view n represents the n-th imaging in the imaging route, the measurement point m represents the number of a dot in each field of view, x represents a coordinate in x-direction (lateral direction), and y represents a coordinate in y-direction (vertical direction). The coordinate system has the lower left corner of the calibration plate 20 as its origin (0, 0), the rightward direction as the positive x-direction, and the upward direction as the positive y-direction.

A specific example of correcting the detected coordinates of the measurement point in step S9 of the dimension inspection shown in FIG. 7 after calibration with the calibration plate 20 shown in FIG. 11 will now be described. In the correction process in step S9, corrected measurement values are calculated with Formulas 9a and 9b below.

Corrected measurement value.x=measurement value.x+correction value.x (9a)

Corrected measurement value.y=measurement
value.y+correction value.y    (9b)

Figure 14:
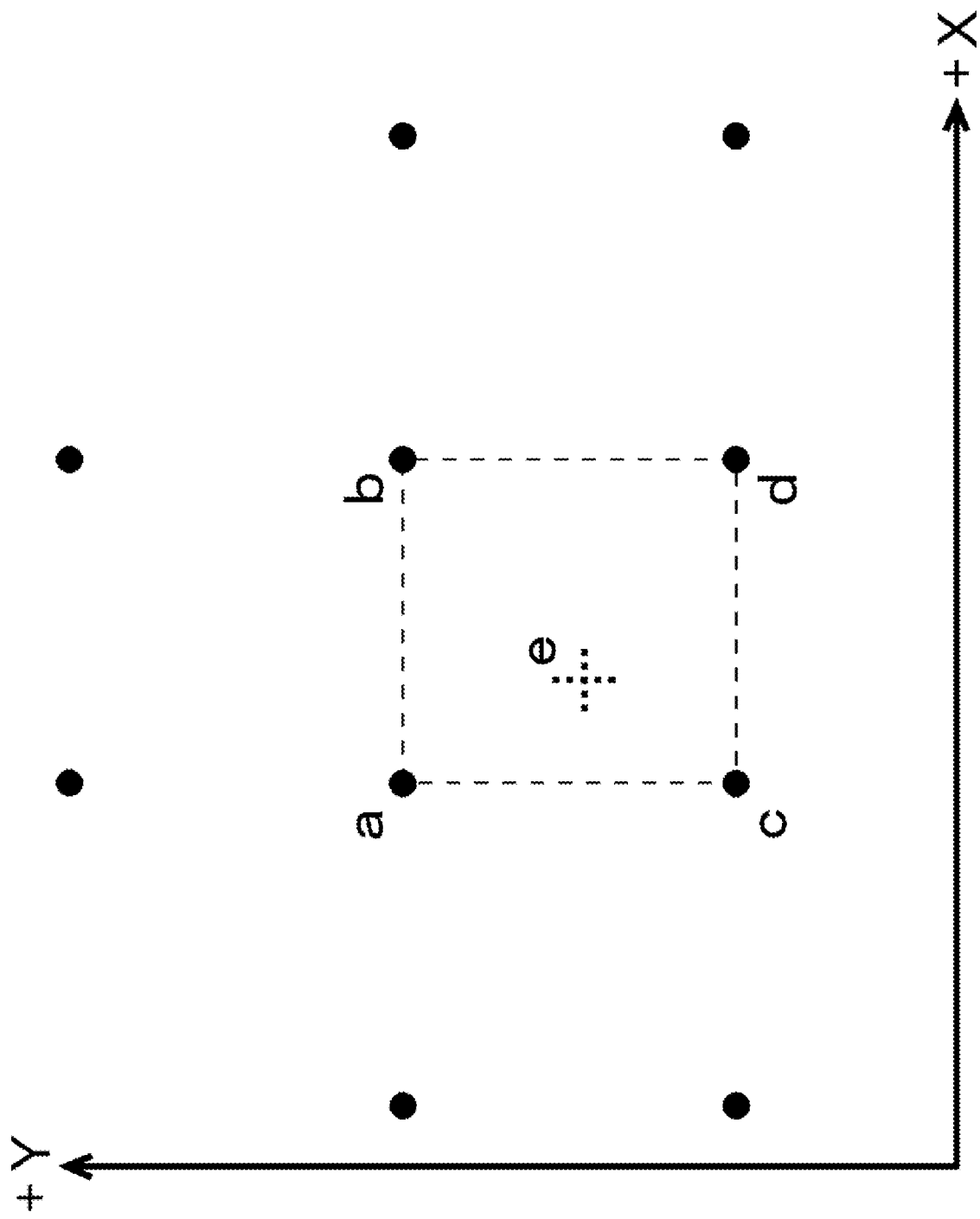
FIG. 14 is a diagram describing correction of position coordinates of a measurement point in the embodiment.

In the formulas, the correction value.x and the correction value.y are calculated using data in the correction table for a dot nearest to the measurement point. Correction of the X- and Y-coordinate values of a measurement target point e (indicated with a broken plus sign) in a dimension inspection will now be described with reference to FIG. 14. The calculation formulas 10a and 10b for calculating correction values for the X- and Y-coordinate values of the measurement target point e are described below. The correction values obtained for the measurement points a, b, c, and d imaged in calibration are represented by C(a), C(b), C(c), and C(d), respectively. The correction value obtained for the measurement target point e imaged is represented by C(e), and _X and _Y indicate an X-coordinate value and a Y-coordinate value, respectively. The X- and Y-coordinates of the measurement points a to c are normalized with c being (0, 0). When the measurement target point is surrounded by two or two measurement points alone, similar calculations are performed for the one or two measurement points.

$$C(e)\_X=(1-e\_X)(0+e\_Y)C(a)\_X+(0+e\_X)(0+e\_Y)C(b)\_X+(1-e\_X)(1-e\_Y)C(c)\_X+(0+e\_X)(1-e\_Y)C(d)\_X \quad (10a)$$

$$C(e)\_Y=(1-e\_X)(0+e\_Y)C(a)\_Y+(0+e\_X)(0+e\_Y)C(b)\_Y+(1-e\_X)(1-e\_Y)C(c)\_Y+(0+e\_X)(1-e\_Y)C(d)\_Y \quad (10b)$$

In this manner, the dimension inspection device 1 can correct detection values from the linear scales 8, 9, and 10 more accurately for the position coordinates of the measurement point P on the substrate 11 when the linear scales 8, 9, and 10 are tilted or deviate relative to one another and when such tilting or deviation varies depending on the moving direction of the imaging unit 3. In the present embodiment, as described above, to actually measure the position of each measurement point (each dot) on the calibration plate 20, the imaging unit 3 travels the same route as the imaging route traveled in an actual dimension inspection of the substrate 11, stops at the same position as the position at which the imaging unit 3 stops in a dimension inspection of the substrate 11, obtains an image of each measurement point (each dot), and obtains a correction value for each dot based on the obtained image. The direction in which the imaging unit 3 moves in an inspection of the substrate 11 is the same as the direction in which the imaging unit 3 moves in the process of obtaining actual measurement values. This allows correction of detection values from the linear scales 8, 9, and 10 using more appropriate correction values.

In the present embodiment, as shown in FIG. 11, in an actual dimension inspection of the substrate 11, an image of each measurement point (each dot) in the field of view (1), the field of view (2), the field of view (3), and subsequent fields of view corresponding to the fields of view in the areas subjected to imaging with the imaging unit 3 alone is obtained to calculate a correction value for each dot. Thus, imaging of a limited number of dots alone and calculation of correction values for the dots may be performed. This reduces the amount of work for calculating correction values and saves the storage space for storing correction values.

In the above embodiment of the present invention, the correction value table may be created and stored in a manner associated with the imaging route for the imaging unit 3 in a dimension inspection of the substrate 11. However, the imaging route is defined for each dimension inspection program for the dimension inspection device 1. Thus, a correction value table may be created and stored in a manner associated with each dimension inspection program in some embodiments. In creating the correction value table, correction values in four classes corresponding to four directions in which the imaging unit 3 moves, or more specifically, the positive X-direction, the negative X-direction, the positive Y-direction, and the negative Y-direction may be obtained for all or some dots on the calibration plate 20 and stored in the correction value table. In this case, in an actual dimension inspection of the substrate 11, correction values for each dot corresponding to the direction in which the imaging unit 3 moves immediately before stopping to image the inspection target are read from the correction table. The detection values from the linear scales 8, 9, and 10 are corrected using the read correction values. This also reduces variations in correction values depending on the moving direction of the imaging unit 3.

The elements in the aspects of the present invention below are identified with reference numerals used in the drawings to show the correspondence between these elements and the components in the embodiments.

Aspect 1

A position measurement method used by a device (1) including an imaging unit (3) configured to image a predetermined measurement point (P) on a measurement target (11) and a position detector (8, 9, 10) configured to detect a position of the imaging unit (3) or the measurement target (11), the device (1) being configured to measure, using a detection value from the position detector when the imaging unit (3) images the measurement point (P), position coordinates of the measurement point (P) in a specification coordinate system, the method comprising:

obtaining, with the device, position coordinates of each of a plurality of predetermined indices (22) arranged two-dimensionally on a calibration plate (20) as an actual measurement value in the specification coordinate system;

obtaining, as a correction value, a difference between the actual measurement value and a true value, the true value resulting from transformation of position coordinates of each of the plurality of predetermined indices (22) obtained in advance with another device with respect to a reference point on the calibration plate (20) to position coordinates in the specification coordinate system; and correcting the detection value from the position detector (8, 9, 10) using the correction value, wherein the correction value is obtained in a manner associated with a moving direction of the imaging unit (3) or the measurement target (11) for the imaging unit (3) imaging the measurement point (P).

Aspect 2

A position measurement method used by a device (1) including an imaging unit (3) configured to image a predetermined measurement point (P) on a measurement target (11) and a position detector (8, 9, 10) configured to detect a position of the imaging unit (3) or the measurement target (11), the device (1) being configured to measure, using a detection value from the position detector when the imaging unit (3) images the measurement point (P), position coordinates of the measurement point (P) in a specification coordinate system, the method comprising:

obtaining, with the device, position coordinates of each of a plurality of predetermined indices (22) arranged two-dimensionally on a calibration plate (20) as an actual measurement value in the specification coordinate system;

obtaining, as a correction value, a difference between the actual measurement value and a true value, the true value resulting from transformation of position coordinates of each of the plurality of predetermined indices (22) obtained in advance with another device with respect to a reference point on the calibration plate (20) to position coordinates in the specification coordinate system; and correcting the detection value from the position detector (8, 9, 10) using the correction value, wherein the imaging unit (3) images a plurality of the measurement points (P) on the measurement target (3) along a predetermined route to measure position coordinates of the plurality of measurement points (P), and the correction value is obtained in a manner associated with the predetermined route.

DESCRIPTION OF SYMBOLS 1 dimension inspection device
2 camera
3 imaging unit
8, 9, 10 linear scale
12 origin
P measurement point
20 calibration plate

The invention claimed is:

1. A position measurement method used by a device including an imaging unit configured to image a predetermined measurement point on a measurement target and a position detector configured to detect a position of the imaging unit or the measurement target, the device being configured to measure, using a detection value from the position detector when the imaging unit images the measurement point, position coordinates of the measurement point in a specification coordinate system, the method comprising:
obtaining, with the device, position coordinates of each of a plurality of predetermined indices arranged two-dimensionally on a calibration plate as an actual measurement value in the specification coordinate system;
obtaining, as a correction value, a difference between the actual measurement value and a true value, the true value resulting from transformation of position coordinates of each of the plurality of predetermined indices obtained in advance with another device with respect to a reference point on the calibration plate to position coordinates in the specification coordinate system; and
correcting the detection value from the position detector using the correction value,
wherein the correction value is obtained in a manner associated with a moving direction of the imaging unit or the measurement target for the imaging unit imaging the measurement point.

2. The position measurement method according to claim 1, wherein
the measuring, with the device, the position coordinates of the measurement point in the specification coordinate system includes
detecting, with the position detector, position coordinates of a reference point in a region on the measurement target to be imaged by the imaging unit in the specification coordinate system,
detecting position coordinates in a field of view of the measurement point with respect to the reference point in the region to be imaged by the imaging unit, and
measuring the position coordinates of the measurement point in the specification coordinate system by adding the detected coordinates in the field of view to the position coordinates of the reference point in the specification coordinate system.

3. A position measurement method used by a device including an imaging unit configured to image a predetermined measurement point on a measurement target and a position detector configured to detect a position of the imaging unit or the measurement target, the device being configured to measure, using a detection value from the position detector when the imaging unit images the measurement point, position coordinates of the measurement point in a specification coordinate system, the method comprising:
obtaining, with the device, position coordinates of each of a plurality of predetermined indices arranged two-dimensionally on a calibration plate as an actual measurement value in the specification coordinate system;
obtaining, as a correction value, a difference between the actual measurement value and a true value, the true value resulting from transformation of position coordinates of each of the plurality of predetermined indices obtained in advance with another device with respect to a reference point on the calibration plate to position coordinates in the specification coordinate system; and
correcting the detection value from the position detector using the correction value,
wherein the imaging unit images a plurality of the measurement points on the measurement target along a predetermined route to measure position coordinates of the plurality of measurement points, and
the correction value is obtained in a manner associated with the predetermined route.

4. The position measurement method according to claim 3, wherein
the obtaining, with the device, the position coordinates of each of the plurality of predetermined indices on the calibration plate as the actual measurement value in the specification coordinate system includes imaging, with the imaging unit, the plurality of predetermined indices along the predetermined route.

5. The position measurement method according to claim 4, wherein
the imaging, with the imaging unit, the plurality of measurement points along the predetermined route to measure the position coordinates of the plurality of measurement points includes obtaining the correction value for an index of the plurality of predetermined indices corresponding to a region on the measurement target to be imaged by the imaging unit.

* * * * *